3,319,118
PROCESS AND APPARATUS FOR PRODUCING
PURIFIED FAST PARTICLE BEAMS
Charles C. Damm, Alamo, Calif., assignor to the United
States of America as represented by the United States
Atomic Energy Commission
Filed July 16, 1964, Ser. No. 383,264
11 Claims. (Cl. 315—111)

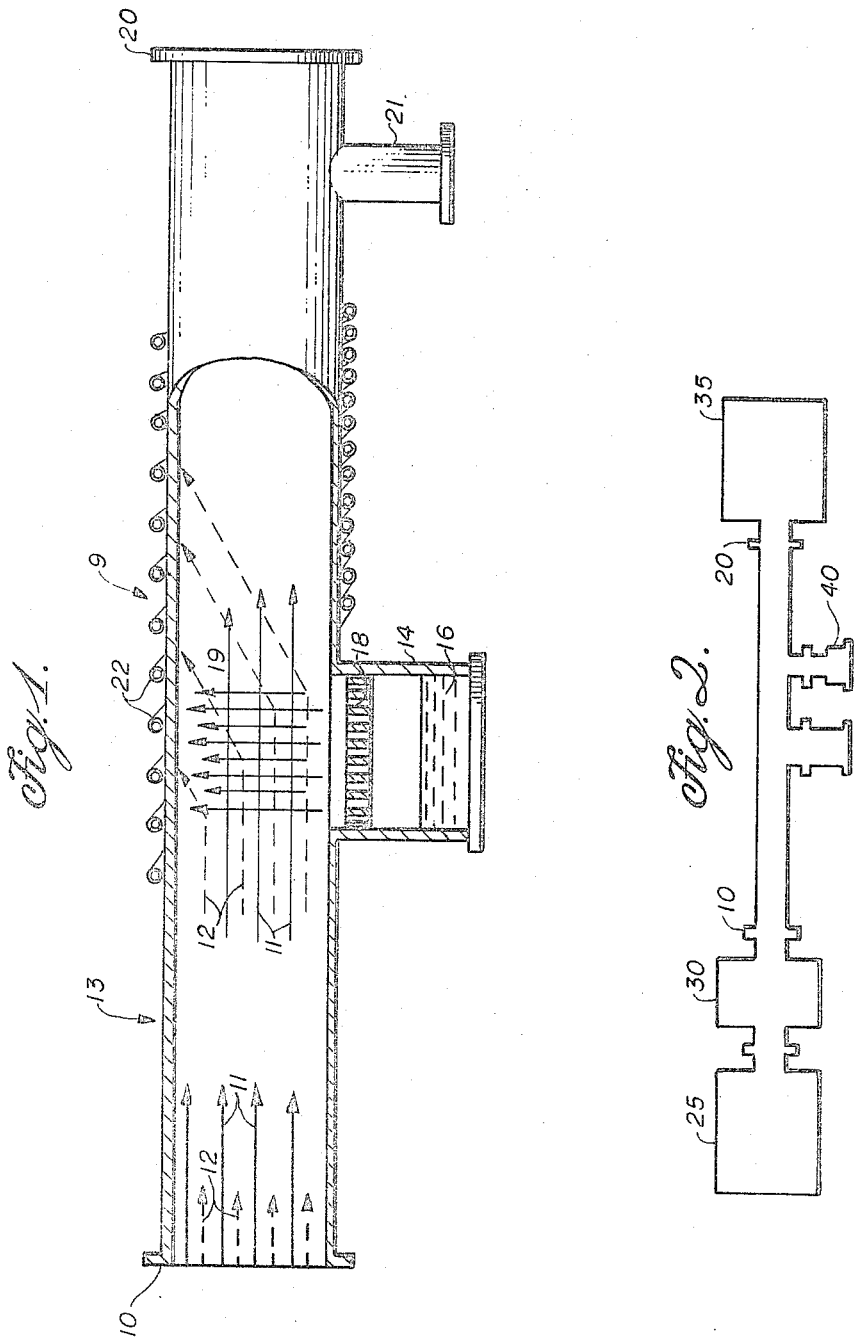

ABSTRACT OF THE DISCLOSURE

A particle beam filter apparatus arranged to selectively purge low velocity particles from a primary beam of particles having mixed velocities, utilizing a particle beam generator which directs a beam of particles of the same velocity as those to be purged across the path of the primary beam.

---

This invention was evolved in the course of, or under, Contract No. W-7405-ENG-48 with the United States Atomic Energy Commission.

The present invention is generally related to a process and apparatus for separating particles of different energies and, more particularly, to a process and apparatus for filtering slow particles from a fast particle beam.

Particle beams, especially those of high energy, find many uses in physics, particularly in the thermonuclear field. To achieve a controlled thermonuclear reaction, it is necessary to impart sufficient energy to thermonuclear fuel ions to overcome the coulombic repulsion force between them and allow fusion. This is accomplished by introducing and trapping energetic particles, if necessary, in a magnetic field to produce a confined plasma and heating it, for example, by magnetic compression to temperatures on the order of millions to hundreds of millions of degrees Kelvin with particle densities of the order of $10^{13}$ to $10^{18}$ particles/cc.

In one method of producing a plasma in a fusion device or thermonuclear reactor, energetic atomically neutral particles are injected into and ionized within the magnetic field; however, this method generally termed neutral injection as practiced heretofore has disadvantages associated therewith. In this method neutral particles produced by methods described more fully hereinafter are ionized by Lorentz dissociation and collisions with other particles present in the region of the magnetic field in which the plasma is formed and confined. The ionized particles are subsequently trapped and confined by the magnetic field due to the change in state, i.e., from a neutral state unaffected by magnetic fields to an ionized state subject to the confining action of the field. In this method neutral particles, having kinetic energies corresponding to temperatures below or at the fusion temperature can be used to provide a plasma with ions of corresponding temperatures. With ions of the latter variety fusion, i.e., thermonuclear reactions may ensue directly. However, if there is a significant proportion of slow, i.e., low temperature particles in this particle beam, the plasma energy losses result from the following charge exchange process:

$$A^+ + B \rightarrow A + B^+$$

where $A^+$ is a trapped energetic ion, B a slow incoming neutral particle, A the energetic neutral particle formed, and $B^+$ the new ion formed. As a consequence of this reaction, an energetic neutral particle, A, is formed which will escape through the field, while the relatively slow new ion, $B^+$ remains in the magnetic field. Hence, it is seen that there is a net decrease in the plasma energy resulting from such charge exchange processes. To decrease the energy lost by this mechanism, it is necessary to prevent slow particles from being introduced into the plasma cavity.

The present invention overcomes the difficulty by providing process and apparatus into the plasma cavity for effecting the removal of slow particles from an energetic neutral particle beam, without interfering with the passage of the fast atoms or molecules. In accordance therewith purified beams of fast particles can be generated and, in essence, there is provided an effective slow particle filter facilitating the full realization of the benefits of injection of high energy neutral particles into a magnetic field, e.g., for ionization therein to form a fusion reaction plasma, or for other purposes.

Accordingly, it is a major object of the present invention to provide a method and apparatus for removing slow particles from a fast particle beam.

A further object of the invention is to provide methods and apparatus for producing purified beams of energetic neutral particles.

Another object of the present invention is to provide a filter process which can be used in a high vacuum system without compromising the vacuum.

Still another object of the present invention is to provide a slow particle filter which is incorporable into a thermonuclear reactor system.

Other objects and advantages will be apparent to those skilled in the art upon consideration of the following description in conjunction with the drawings, of which FIGURE 1, is a cross section view of a preferred filter embodiment of the invention.

FIGURE 2, is a schematic illustration of a fusion reactor arrangement including the filter of the invention.

In general the filter concept of the present invention involves the production of a first particle beam, hereinafter referred to as "filter beam," which is directed to traverse a second particle beam from which slow particles are to be removed yielding a purified neutral particle beam. The latter particle beam will hereinafter be referred to as "feed beam." Since the slow particles of the feed beam require a longer time to pass through the zone wherein the feed beam and the filter beam interact, the filter beam particles are more likely to collide with a slow feed beam particle than with a fast feed beam particle. A collision results in a change of direction of the colliding particles. Therefore, the slow particles are preferentially deflected out of the feed beam into the surrounding space. The collision products are then removed or gathered by, for example, conventional pumping or gathering techniques from the surrounding space. It will be realized that the apparatus for carrying out the process will depend on the environment of the second particle beam. A filter beam may be generated by any of several conventional methods, for example, by the evaporation of liquids, by allowing a gas to escape from a reservoir, etc., with appropriate collimation. The collision products may be removed by pumping or condensation if the filtering process takes place in a closed high vacuum system, on the other hand, in large volumes or in free space, no direct removal of the collision products is necessary.

More particularly filter apparatus of the invention may be provided as a unitary assembly 9 as shown in FIGURE 1 adapted to be disposed between an energetic particle generator or source productive of a collimated beam of such particles and a vacuum vessel in which the purified particle beam is to be employed as shown in FIGURE 2 of the drawing. For example, such a vessel 35 may be the evacuable housing of a thermonuclear reactor or fusion device such as a Magnetic Mirror Machine or Pyratron Thermonuclear Reactor of the type disclosed in the application of Richard F. Post, entitled Pyratron Thermonuclear Reactor and Process, U.S. Patent No.

3,170,841, issued Feb. 23, 1965. The filter concept of the invention is especially useful when an energetic neutral particle source is employed for injecting fusion fuel particles into such a reactor in accordance with theory set forth in Paper No. 380, page 275, volume 32, Proceedings of The Second International Conference on the Peaceful Uses of Atomic Energy, Geneva, 1958.

Moreover, the present system may be used in the same manner as the neutral injection system disclosed in the application of Charles C. Damm entitled: A Method of Multiple Atomic Beam Injection for Thermonuclear Reactors, U.S. Patent No. 3,152,959, issued Oct. 13, 1964, the disclosure of which is incorporated herein by reference. At least one ion source 25 coupled in tandem with at least one beam neutralizer 30 (both shown schematically) are employed in the manner disclosed in the aforesaid application of Charles C. Damm to produce a collimated beam of energetic neutral particles of either a single isotopic composition or of intermixed composition, e.g., protium, deuterium, tritium, helium 3, etc., which is directed axially from final neutralizer 30. Other accessory apparatus such as cooling and evacuating means, vapor sources, etc., are not shown for simplicity.

Filter apparatus assembly 9 is conveniently provided in the form of a cylindrical tube 13 having terminal flanges 10 and 20 for attaching to neutralizer 30 and vacuum vessel 35, respectively, so that neutral particles of the feed beam emerging from the neutralizer are directed through tube 13 to the plasma confinement chamber 35. The feed beam of fast neutral particles 11, directed through tube 13 are schematically shown as long arrows. The velocities of the fast particles are generally in the range of $10^4$ to $10^6$ m./sec. Travelling with these fast particles are other neutral particles 12 of substantially slower speed, shown schematically as broken arrows. These slow particles originate in the neutralizer and are mainly molecules of the gas used to neutralize the ion beam. Their velocities correspond to the diffusion velocity at the temperature in the neutralizer and are generally less than $10^3$ m./sec. A closed tubular extension 14 is hermetically mounted to the tube 13 to project perpendicularly therefrom. The lower portion of tubular extension 14 acts as a reservoir for a readily vaporizable liquid 16. In the present embodiment water has been found satisfactory. Water vapor molecules at room temperature have a velocity comparable to that of the slow feed beam particles. Vapor molecules leaving the surface of the water pass through a collimator 18, which may be a plate having a large number of channels of small diameter formed therein, and disposed near the junction of the tubular extension 14 and the tube 13. The collimator axis is transverse to the direction of the neutral particle feed beam. Hence a filter particle beam 19 formed by diffusing vapor is directed across tube 13. The filter beam 19 traverses tube 13 and hence intersects the paths of fast particles 11 and slow particles 12. The collision probability between a slow filter beam particle and a fast feed beam particle is smaller than that between a filter beam particle and a slow feed beam particle, since the slow feed beam particles take longer to traverse the filter beam 19 than do the fast feed beam particles. Due to the longer exposure of the slower particles to the filter beam 19, without undergoing a collision and continue as a particles whereas most fast particles pass through the filter beam 19, without undergoing a collision and continue as a collimated energetic neutral particle beam. The direction of motion of a particle is changed by colliding with a filter beam particle, whence most of the slow particles are deflected out of the beam toward the walls of tube 13.

The deflected slow particle collision products as well as the filter beam particles, mainly water molecules, are removed from within the tube 13 to prevent these materials from diffusing into said reactor or interfering with the beam. Particularly effective toward removing the molecules are coils 22 wound around the tube 13 through which a cooling medium such as liquid nitrogen is passed from a source (not shown). Water vapor molecules especially which encounter the cooled walls of the tube 13 are condensed and collected thereon. Another provision for removing the collision products is a conventional vacuum pump, such as a gettering or diffusion pump 40 connected to tube 13 by way of a port 21 proximate to flange 20.

Whereas this description has dealt with a particular application of the filter beam in a plasma containment system, it is to be understood that the particle filter principle is applicable to filtering slow particles out of fast particle beams in general. The filter particle beam may be obtained not only by the present evaporation method but by any conventional methods of forming beams of neutral particles as mentioned above.

The present filter is particularly useful in applications where the velocity of the slow contaminants is less than about $1/10$ of the velocity of the fast particles. As the velocity differential between the particles becomes smaller, their separation becomes more difficult and high levels of removal of slow particles are achieved only at the expense of loss of fast particle current density.

A compromise between a high purity, small current density fast particle beam and a beam of higher density fast particles but larger residual slow particle contamination may be made by increasing or decreasing the frequency of collisions between the filter beam particles and feed beam particles. The frequency of collisions may be altered in two ways:

(1) By altering the density of the filter beam 19 for example by changing the effective temperature, hence energy, of the source generating the particular gas or vapor that is injected into tube 13.

(2) By increasing the cross sectional dimension of the volume in which the two beams intersect. This can be accomplished by increasing the width of the filter beam 19, e.g., increasing the effective area of collimator 18 such as by means of an adjustable gate and longer individual or multiple filter beam generators.

*Example*

A molecular feed beam, composed of fast particles 11 having velocities of about $10^6$ m./sec. and slow particles 12 whose velocities were at least two orders of magnitude less, were passed through a water vapor filter beam 19 obtained from water at room temperature, and having an average velocity of about 800 m./sec. The background pressure in the cavity was on the order of $10^{-10}$ mm./Hg. The slow particle pressure was measured before and after the operation of the filter beam with a gauge located at the end of the tube. The results are given in the table below and illustrate the effectiveness of the procedure.

Slow particle pressure without filter
    beam in operation _____ mm. Hg $3.2 \times 10^{-9}$
Slow particle pressure with filter
    beam in operation _____ mm. Hg $0.7 \times 10^{-9}$
Net reduction of slow particle pressure ____ percent 78

While the invention is described with respect to preferred embodiments, it will be apparent to those skilled in the art that numerous variations and modifications may be made within the spirit and scope of the invention and thus it is not intended to limit the invention except as defined in the following claims.

What is claimed is:

1. In a process for removing slow particles having velocities of about 1000 m./sec. from a first particle beam traversing an evacuated region and including particles having velocities at least one order of magnitude greater than said slow particles, the steps of
    (a) vaporizing a fluid,
    (b) collimating said fluid vapor in a collimator disposed in the proximity of said first particle beam with its axis transverse to the principal axis of said particle beam, (c) directing said collimated vapor particles to traverse an area of first said particle beam whereby said vapor and particle beam interact to form collision products, and freezing out said collision products by disposing a low temperature surface in the path of said collision products.

2. Apparatus for producing a purified fast particle beam, comprising:
(a) an evacuated chamber having first and second inlet means, said first inlet means being disposed relative to said second inlet, such that a coextending project of said second inlet transversely intersects the coextending projection of said first inlet within said chamber;
(b) means hermetically communicating with said first inlet for generating and directing a first particle beam including fast and slow particles into said chamber along said coextending projection of said first inlet;
(c) means hermetically communicating with said second inlet for generating and directing a second particle beam into said chamber along said coextending projection of said second inlet to traverse said first particle beam in the area of said intersecting projections, to interact therewith to form collision products, principally with slow particles therein, leaving fast particles in the beam emerging from said area; and
(d) means for removing said collision products from said area of intersecting projections.

3. Apparatus of claim 2 further defined by said means for removing collision products being means for cooling said chamber to a temperature below the condensation point of at least a substantial portion of said collision products.

4. Apparatus of claim 2 further defined by said means for removing said collision products being at least one vacuum pump hermetically connected to said chamber.

5. A filter for removing slow neutral particles from a first neutral particle beam including fast and slow neutral particles comprising:
(a) an evacuated chamber having a first and second inlet means, said first inlet disposed on said chamber relative to said second inlet such that a coextending projection of said second inlet transversely intercepts the coextending projection of said first inlet,
(b) means for introducing said first particle beam into said chamber, said means hermetically communicating with said first inlet means,
(c) a reservoir having outward means hermetically communicating with said second inlet means,
(d) a medium adapted to furnish free neutral particles contained within said reservoir, said reservoir outward means, said second inlet means, and a cross sectional area of said first particle beam being aligned along the path of said free particles,
(e) and means for removing collision products produced by interaction between said free neutral particles and said first neutral particle beam.

6. Apparatus for producing a purified fast particle beam, comprising:
(a) an evacuated chamber having first and second inlet means, said first inlet means disposed relative to said second inlet means such that a coextending projection of said second inlet means transversely intersects the coextending projection of said first inlet means within said chamber;
(b) means hermetically communicating with said first inlet for generating and directing a first particle beam including fast and slow particles into said chamber along said coextending projection of said first inlet;

(c) a reservoir having outlet means hermetically communicating with said second inlet means;
(d) a medium disposed within said reservoir for furnishing free particles directed along said projection of said second inlet means;
(e) a collimator disposed circumjacent said projection of said second inlet to direct said free particles therealong into the area of transverse intersection of said projections so that said free particles traverse an area of said first beam therein, transverse to the direction of travel of said first particle beam to interact with and produce collision products principally with slow particles therein, leaving fast particles in the beam emerging therefrom; and
(f) means for removing said collision products produced by interaction between said free particles and said first particle beam.

7. Apparatus as defined in claim 6 having means for heating said reservoir.

8. Apparatus as defined in claim 6 wherein said medium is a gas.

9. Apparatus as defined in claim 6 wherein said medium is a liquid.

10. Apparatus as defined in claim 6 wherein said medium is water.

11. A filter for removing slow particles from a first particle beam including fast and slow particles comprising:
(a) an evacuated cylindrical chamber having first and second inlet means and an outlet means, said first inlet disposed on said chamber relative to said second inlet such that a coextending projection of said second inlet transversely intercepts the coextending projection of said first inlet, said outlet means being adapted to hermetically join said chamber to a magnetic plasma confinement housing, said first inlet means and said outlet means being aligned along a straight line locus, said first inlet adapted to hermetically join the first particle beam generator to said chamber,
(b) a reservoir having an outlet means mounted in hermetical relationship to said second inlet means of said evacuated chamber,
(c) a liquid medium adapted to furnish free vapor particles disposed within said reservoir,
(d) heater means disposed in heat conducting communication with said reservoir.
(e) a collimator disposed between the surface of said liquid medium and a cross sectional area of said first particle beam, in a straight line free path relationship therewith, the axis of said collimator being transverse to said cross sectional area of said first particle beam,
(f) cooling coils adapted for the circulation of a liquified gas therethrough, said cooling coils being disposed about said evacuated chamber in the proximity of said cross zone of interaction of said particle beams,
(g) and at least one vacuum pump attached to said evacuated chamber and in pressure communication with the volume defined thereby, said vacuum pump being adapted to maintain a pressure of at least $10^{-8}$ mm./Hg in said chamber.

References Cited by the Examiner
UNITED STATES PATENTS

| 2,883,568 | 4/1959 | Beam | 313—230 |
| 3,075,115 | 1/1963 | Flowers | 315—111 |
| 3,136,908 | 6/1964 | Weinman | 313—63 |
| 3,258,633 | 6/1966 | Swartz | 315—111 |

JAMES W. LAWRENCE, *Primary Examiner.*

S. SCHLOSSER, *Assistant Examiner.*